United States Patent [19]

Kawamura et al.

[11] Patent Number: 5,124,622
[45] Date of Patent: Jun. 23, 1992

[54] REMOTE DIAGNOSIS SYSTEM OF NUMERICAL CONTROL APPARATUS

[75] Inventors: Hideaki Kawamura; Takao Sasaki, both of Hachioji; Kunihiko Murakami, Hino; Masahiko Hosokawa, Minamitsura, all of Japan

[73] Assignee: Fanuc Ltd., Yamanashi, Japan

[21] Appl. No.: 465,219

[22] PCT Filed: Jun. 27, 1989

[86] PCT No.: PCT/JP89/00640
§ 371 Date: Mar. 13, 1990
§ 102(e) Date: Mar. 13, 1990

[87] PCT Pub. No.: WO90/01186
PCT Pub. Date: Feb. 8, 1990

[30] Foreign Application Priority Data
Jul. 26, 1988 [JP] Japan ................. 63-186604

[51] Int. Cl.⁵ ............................................. G05B 19/18
[52] U.S. Cl. ................................. 318/569; 318/568.1; 318/565; 364/474.19; 364/413.22; 364/413.13
[58] Field of Search .................. 364/474.11, 474.19, 364/474.22, 413.22, 413.13; 318/568.1, 569, 565

[56] References Cited

U.S. PATENT DOCUMENTS

| | | | |
|---|---|---|---|
| 4,109,309 | 8/1978 | Johnstone et al. | 364/474.19 |
| 4,390,953 | 6/1983 | Johnstone | 364/474.19 |
| 4,764,870 | 8/1988 | Haskin | 364/413.22 X |
| 4,882,670 | 11/1989 | Isobe et al. | 364/474.22 |
| 4,907,163 | 3/1990 | Cook | 364/474.22 |
| 5,005,126 | 4/1991 | Haskin | 364/413.13 |

Primary Examiner—William M. Shoop, Jr.
Assistant Examiner—Saul M. Bergmann
Attorney, Agent, or Firm—Staas & Halsey

[57] ABSTRACT

A system for a remote diagnosis of a numerical control apparatus (CNC), for remotely diagnosing a failure of the CNC. A personal computer is operated by a service engineer and a remote operation command is output to the CNC through a communication line. Diagnosis data of the CNC is selected based on the remote operation command, transferred to the personal computer, and displayed on a display unit, whereby the service engineer can make diagnosis of the cause of the failure at the CNC, based on the diagnosis data displayed.

4 Claims, 2 Drawing Sheets

REMOTE DIAGNOSIS SYSTEM OF NUMERICAL CONTROL APPARATUS

FIELD OF THE INVENTION

The present invention relates to a system for a remote diagnosis of a numerical control apparatus (CNC) for remotely diagnosing a failure of the CNC, and more specifically, to a system for a remote diagnosis of the CNC by which displayed data at the numerical control apparatus is transferred to a computer by a remote operation.

DESCRIPTION OF THE RELATED ART

Numerical control apparatuses have become more complicated and sophisticated due to advances in semiconductor technology including microprocessors and software technology, and the failure rate of numerical control apparatuses has been lowered by providing greater reliability technology. Nevertheless when a failure occurs, it is very difficult to find the cause thereof.

More specifically, when a complicated failure occurs, the service engineer must have an overall knowledge of electronics, software, machines and machining technology to be able to correct the failure.

Nevertheless, very few service engineers have sufficient knowledge to do this, and thus a waste of manpower is incurred if such a competent engineer must be exclusively posted at each factory wherein such numerical control apparatuses are installed.

SUMMARY OF THE INVENTION

Taking the above into consideration, an object of the present invention is to provide a system for a remote diagnosis of a CNC by which data displayed at the numerical control apparatus is transferred to a computer by a remote operation.

To solve the above problem, in accordance with the present invention, there is provided a system for a remote diagnosis of a numerical control system (CNC), for remotely diagnosing a failure of the CNC. The system comprises a computer including an operation key for executing a remote operation command, an operation command conversion means for converting the remote operation command to a text to be transmitted, a operation data conversion means for converting diagnosis data to a video signal, a display unit for displaying the data to be displayed, a communication control unit for transmitting the text to be transmitted and receiving the diagnosis data, a numerical control apparatus including a remote operation command decoding means for decoding the remote command, a diagnosis data selection means for selecting required diagnosis data based on the remote operation command, a display unit for displaying the diagnosis data, a video data conversion means for converting the diagnosis data to a text to be transmitted, a communication control unit for receiving the remote operation command and transmitting the diagnosis data, and a communication line linking the computer to the numerical control apparatus.

The computer generates and outputs a remote operation command to the numerical control apparatus through the communication line, and diagnosis data of the numerical control apparatus selected in accordance with this remote operation command is transferred to the computer.

Accordingly the service engineer can diagnose the cause of a failure of the numerical control apparatus in accordance with the data displayed on the computer.

DESCRIPTION OF THE PREFERRED EMBODIMENTS

An embodiment of the present invention will be described below with reference to drawings.

Figure 1:
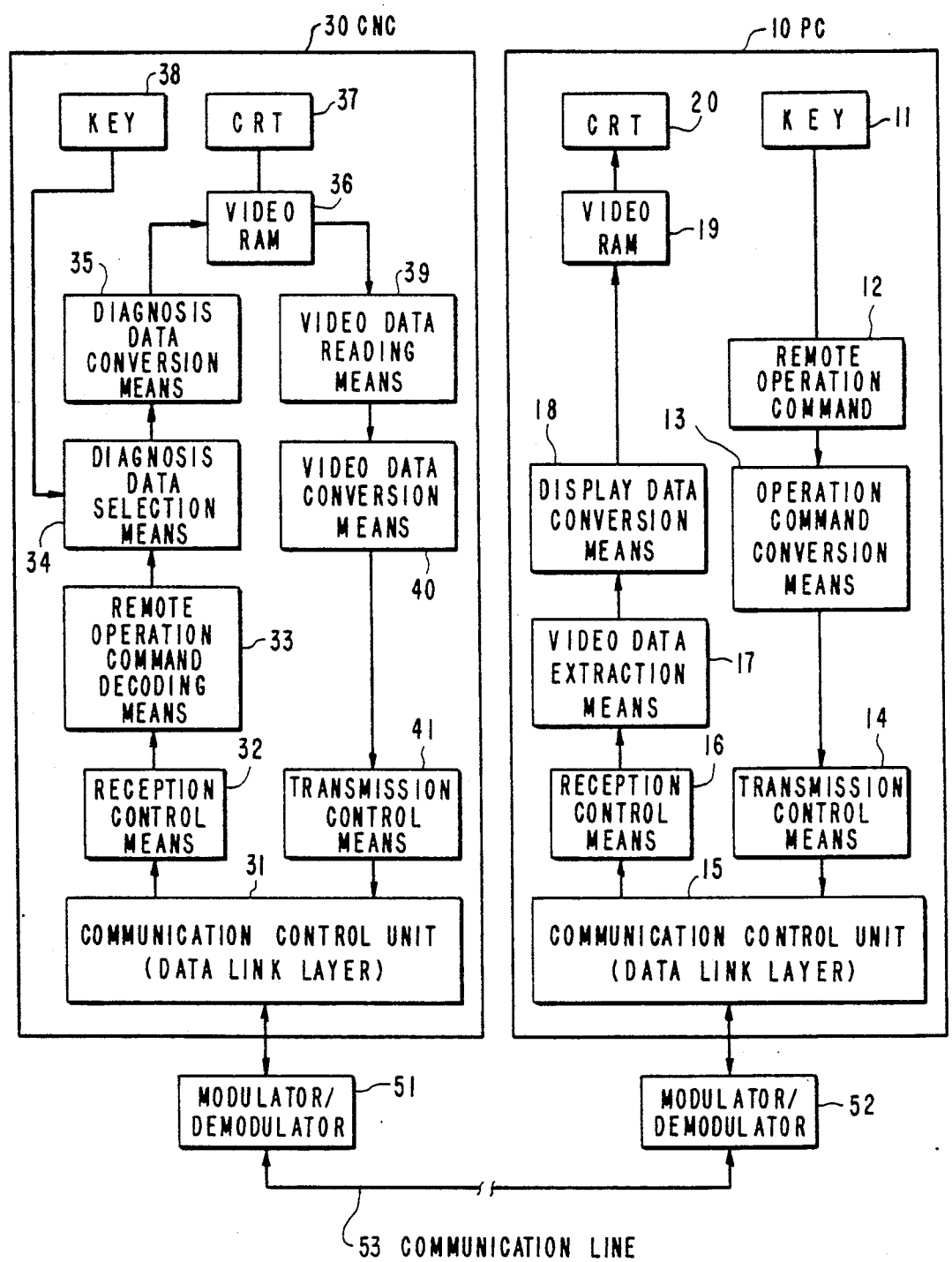
FIG. 1 is a block diagram of the system for a remote diagnosis of a CNC according to the present invention.

FIG. 1 shows a block diagram of an embodiment of a system for a remote diagnosis of a CNC according to the present invention wherein 10 designates a computer, which can be a 16 bits or 32 bits general personal computer (PC) or a work station. Here, the description is based on the use of a personal computer (PC). The personal computer 10 is installed at a service base, and remote operation commands are executed by a service engineer having the abovementioned overall knowledge. The service engineer generates a required operation command through the personal computer 10, obtains the necessary data from a remote numerical control apparatus, makes a diagnosis of the failure and finds the failed portion or an error in a machining program or set parameters, and outputs instructions for the repair of the CNC or correction of the machining program, as necessary.

Numeral 11 designates an operation key by which a required remote operation command 12 is output; and 13 designates an operation command conversion means for converting the remote operation command 12 to a text to be transmitted. More specifically, the remote operation command is converted to a code or format for transmission and a check bit and the like is added thereto. Numeral 14 designates a transmission control means for notifying the start of a text transmission.

Numeral 15 designates a communication control unit for transmitting the remote operation command and receiving diagnosis data. Although an RS232C is used here as a physical interface, other interfaces may be used as desired.

Numeral 16 designates a reception control means for internally recognizing that diagnosis data has been received from the numerical control apparatus 30; 17 designates a video data extraction means for extracting video RAM data from the received diagnosis data; 18 designates a display data conversion means for converting the data to one image of video data displayed on a display unit; 19 designates a video RAM for storing one displayed image of video data, which can be, of course, enlarged to the capacity of the display unit for displaying a plurality of images, as necessary; and 20 designates the display unit which can be a CRT, a liquid crystal display unit or the like. Here, a CRT is used here.

In this description, one image displayed on a display unit of the numerical control apparatus, to be described later, is displayed on the display unit 20, whereby the service engineer at a service center can carry out a diagnosis of the remotely installed numerical control apparatus at a service center by studying the image displayed.

Numeral 30 designates the numerical control apparatus (CNC) to be diagnosed, which is installed at a location remote from the service center at which the service engineer is working; 31 designates a communication control unit comprising the same RS232C interface as that of the communication control unit 15; 32 designates a reception control means for internally recognizing that a remote operation command has been received; 33 designates a remote operation command decoding means for decoding a remote operation command from a received signal, where this remote operation command is a selection signal for selecting displayed images; and 34 designates a diagnosis data selection means. Although diagnosis data is selected by the remote operation command, in practice display image is selected from an internal memory. The diagnosis data selection means 34 receives a selection signal input by an operator at the numerical control apparatus 30 through an operation key 38, and this signal is executed in accordance with an instruction output by the service engineer working at the personal computer 10.

Numeral 35 designates a diagnosis data conversion means for converting data selected from a displayed image to one data image capable of being displayed; and 36 designates a video RAM for storing video data to be displayed at the display unit 37. This display unit 37 is monitored by an operator staying in the vicinity of the numerical control apparatus.

Data in the video RAM 36 is read by a video data reading means 39, a check bit and the like is added to that data by a video data conversion means 40, and the data is then converted to a text to be transmitted. When notification of a transmission is output from a transmission control means 41, the text to be transmitted is output from the communication control unit 31.

The following images are displayed by the numerical control apparatus 30 which is remotely operated.

(i) Images displaying a present position and remaining moving amount

A present position and the like is a basic amount used to determine the location of the machine at which a failure has occurred, and thus is the basic data used for a failure diagnosis.

(ii) Image display alarm

An alarm image display displays the content of the alarm. Although an operator can often discriminate a simple alarm, a service engineer must study and discriminate a complex alarm. In particular, the alarm image displayed must be studied by a service engineer, since an operator in a factory often may not have sufficient knowledge of numerical control apparatuses and the like.

(iii) Image displaying an input/output signal

A signal input or output to and from the numerical control apparatus is used to determine whether external hardware is operating normally.

(iv) Image displaying a ladder state

A failure at the machine can be found by referring to a ladder program contained in a programmable controller or a signal input or output to and from the programmable controller.

In addition to the above, images displaying a part program, parameters, ROM/RAM data, offsets, a version of a system program and the like, must be selected. Of course, these images are only examples and it is possible to predetermine other images necessary for diagnosis of a failure, and select these images as necessary.

Numerals 51 and 52 designate modulators/ demodulators for converting transmitted data to a signal suitable for a communication line 53. Here, a public communication line of about 2400 bits/sec–9600 bits/sec is used as the communication line 53. Preferably, however, a transmission line of at least 64 K bits/sec is used for a high speed digital transmission, to transmit the image data at a high speed. Note, when a high speed communication line is used, the communication control units 15 and 31 must be modified.

Figure 2:
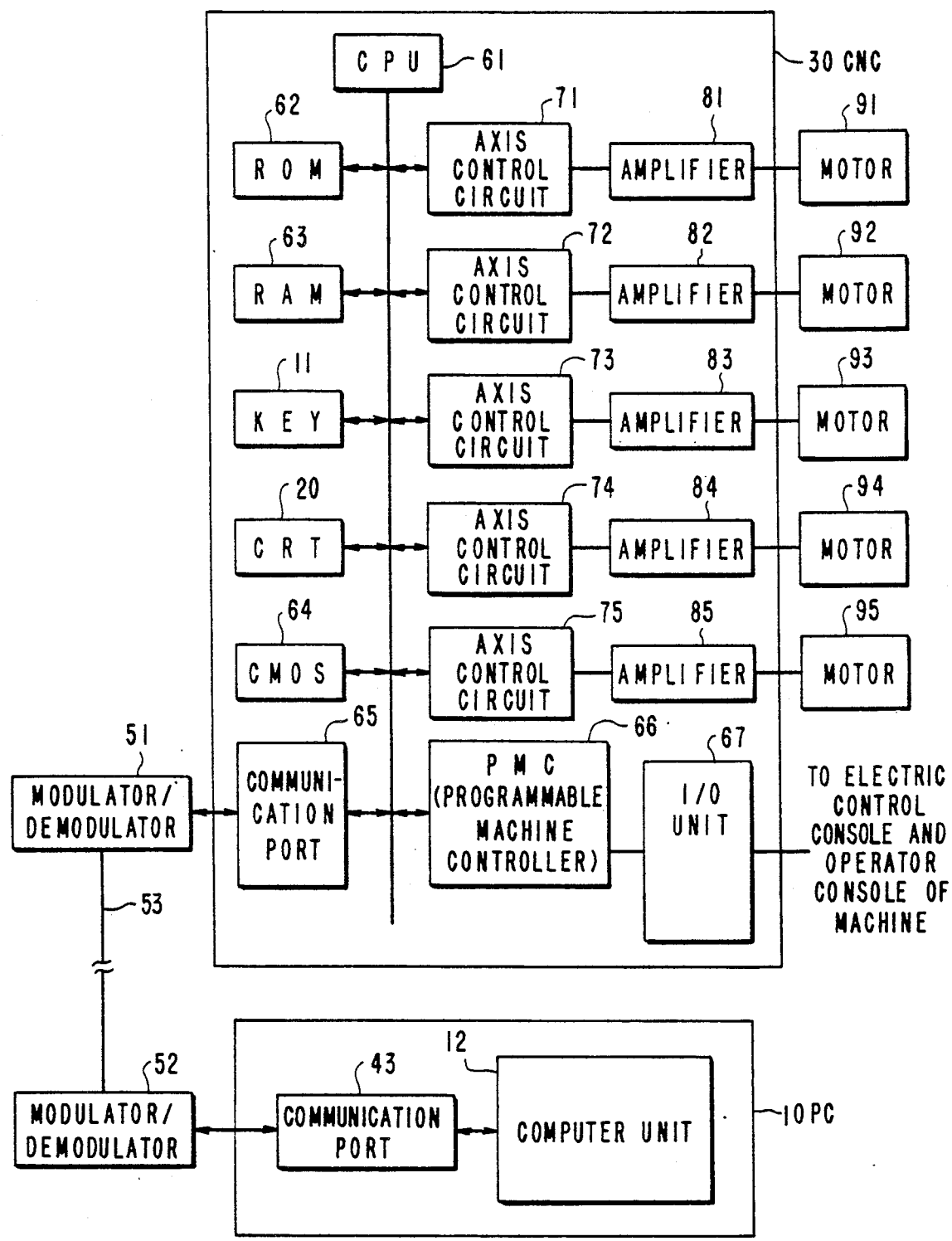
FIG. 2 is a block diagram of hardware according to the present invention.

FIG. 2 is a block diagram showing the hardware of the present invention, wherein 30 designates the numerical control apparatus (CNC); 61 designates a processor for controlling the numerical control apparatus; 62 designates a ROM in which a system program is stored; 63 designates a RAM to which the system program is loaded and in which other data is stored; 11 designates an operation key; 20 designates a display unit; 64 designates a CMOS constituting a non-volatile memory backed up by a battery; 71 to 75 designate axis control circuits for controlling respective axes; and 81 to 85 designate servo amplifiers for driving servo motors 91 to 95.

Numeral 65 designates a communication port for outputting a remote operation signal and the like and receiving a video signal.

Numeral 66 designates a programmable machine controller (PMC) contained in the numerical control apparatus 30, for controlling the machine by a ladder type sequence program; and 67 designates an input/ output unit and an interface to an electric control console or an operator console on the machine side.

Numerals 51 and 52 designate modulators and demodulators; and 53 designates the communication line.

Numeral 10 designates a personal computer having a computer unit 42 to which a communication port 43 is added.

Although the personal computer executes a remote operation to obtain a displayed image selection signal required for the diagnosis, and the diagnosis data is a video signal of a displayed image as mentioned above, it is possible to output a required signal by a remote operation, select the signal from the numerical control apparatus, and receive the signal at the personal computer by a method other than that described above, and for this purpose, a protocol must be predetermined.

As described above, according to the present invention, since the computer can obtain an image signal and the like displayed at the numerical control apparatus installed at a remote place, by a remote operation, a service engineer having the above-mentioned overall knowledge can diagnose a failure of the numerical control apparatus while working at a remote location. As a result, time needed for correcting the failure is shortened, and thus maintenance costs are reduced.

We claim:

1. A system for a remote diagnosis of a numerical control system (CNC), comprising:
    a computer including:
        operation key means for inputting and providing a remote operation command,
        operation command conversion means for converting the remote operation command to a first text to be transmitted,
        video data extraction means for extracting diagnosis data from a second text;
        display data conversion means for converting diagnosis data to a video signal,
        display means for displaying the video signal, and communication means for transmitting the first text and for receiving second text;

a numerical control apparatus including;
 remote operation command decoding means for decoding the first text into the remote operation command,
 diagnosis data selection means for selecting the diagnosis data based on the remote operation command,
 display means for converting the diagnosis data to image data and for displaying the image data,
 video data conversion means for converting the diagnosis data to the second text to be transmitted, and
 communication means for receiving the first text and for transmitting the second text; and communication means, operatively connecting said computer to said numerical control apparatus for providing the second text to said computer and for providing the first text to said numerical control apparatus.

2. A system according to claim 1, wherein said remote operation command comprises a displayed image selection signal and said diagnosis data comprises a video signal of displayed image.

3. A computer, comprising:
 operation key means for providing a remote operation command;
 operation command conversion means for converting the remote operation command to text to be transmitted;
 display data conversion means for converting diagnosis data to a video signal;
 a display unit for displaying the display data; and
 a communication control unit for transmitting the text and for receiving the diagnosis data.

4. A numerical control apparatus, comprising:
remote operation command decoding means for decoding a remote command;
diagnosis data selection means for selecting diagnosis data based on the remote operation command;
display means unit for displaying the diagnosis data;
video data conversion means for converting the diagnosis data to a text to be transmitted; and
communication control means for receiving the remote operation command and for transmitting the diagnosis data.

* * * * *